US006633886B1

(12) United States Patent
Chong (10) Patent No.: US 6,633,886 B1
(45) Date of Patent: Oct. 14, 2003

(54) METHOD OF IMPLEMENTING AN ACYCLIC DIRECTED GRAPH STRUCTURE USING A RELATIONAL DATA-BASE

(76) Inventor: Kah Yuen John Francis Chong, 26 Jalan Rendang, Singapore (SG), 428357

( * ) Notice: Subject to any disclaimer, the term of this patent is extended or adjusted under 35 U.S.C. 154(b) by 0 days.

(21) Appl. No.: 09/623,572

(22) PCT Filed: Mar. 6, 1999

(86) PCT No.: PCT/SG99/00015

§ 371 (c)(1),
(2), (4) Date: Nov. 20, 2000

(87) PCT Pub. No.: WO99/45479

PCT Pub. Date: Sep. 10, 1999

(30) Foreign Application Priority Data

Mar. 6, 1998 (SG) ............................. 9800500

(51) Int. Cl.[7] ............................. G06F 17/30
(52) U.S. Cl. ..................................... 707/102
(58) Field of Search ............................ 707/102, 104.1, 707/1, 103 Y, 101, 103 Z (56) References Cited

U.S. PATENT DOCUMENTS 4,918,621 A * 4/1990 Nado et al. ................ 706/51
5,222,233 A   6/1993 Parks
5,394,556 A   2/1995 Oprescu
5,490,246 A   2/1996 Brotsky et al.
5,515,487 A * 5/1996 Beaudet et al. ............. 345/440
5,612,325 A * 3/1997 Hansen et al. .............. 514/167
5,615,325 A * 3/1997 Peden ........................ 345/854
6,006,233 A * 12/1999 Schultz ...................... 707/101

FOREIGN PATENT DOCUMENTS

WO            94/15305       7/1994

* cited by examiner

Primary Examiner—Safet Metjahic
Assistant Examiner—Sana Al-hashemi
(74) Attorney, Agent, or Firm—Burns, Doane, Swecker & Mathis, L.L.P.

(57) ABSTRACT

A method for implementing an acyclic directed graph structure using a computer relational database system, and a data structure corresponding thereto. An advantageous relational database structure representing the acyclic diagraph can be obtained by creating three table structures storing relationships between nodes in the diagraph and other properties. A node table stores relationships between each node in the diagraph and properties assigned to the nodes. An edge table stores indications of nodes which are directly linked and the direction of the link. A path table stores indications of nodes which are directly or indirectly linked and the direction of those paths. Procedures for maintaining the database structure in a consistent manner are also described.

18 Claims, 2 Drawing Sheets

METHOD OF IMPLEMENTING AN ACYCLIC DIRECTED GRAPH STRUCTURE USING A RELATIONAL DATA-BASE

FIELD OF THE INVENTION

This invention relates to a method for implementing an acyclic directed graph structure, or acyclic diagraph, using a relational database. Acyclic diagraph structures are used frequently to model real world hierarchy systems. Examples of such hierarchy systems where an acyclic diagraph structure may be used are family trees, Object-Oriented relationship models, network routing structure, etc.

BACKGROUND OF THE INVENTION

Despite the prevalence of acyclic diagraph structures in the real world, few computer applications actually use the model. Application developers prefer instead to either use another similar model, the directed tree structure, to emulate acyclic diagraph systems, or alternatively generate "views" of an acyclic diagraph system and represent the views with a directed-tree structure.

The main reason why application programmers tend to avoid modelling the acyclic diagraph structure is due to the complexity of the structure, and the complexity of implementing and maintaining this structure.

A graph is a mathematical system consisting of nodes (or points or vertices) and edges (or links or arcs). The following is a mathematical definition of a graph taken from a book by Jean-Paul Tremblay and Paul G Sorenson (ISBN0-07-065157-4):

"A graph G consist of a nonempty set V called the set of nodes (points, vertices) of the graph, a set E which is the set of edges of the graph, and a mapping from the set of edges E to a set of pairs of elements of V.

We can assume throughout that both sets V and E of a graph are finite. It is also convenient to write a graph as G=(V, E). Notice that the definition of a graph implies that to every edge of the graph G, we can associate a pair of nodes of the graph. If an edge, x∈E is thus associated with a pair of nodes (u, v) where u, v∈V then we say that the edge x connects or joins the nodes u and v. Any two nodes which are connected by an edge in a graph are called adjacent nodes.

In a graph G=(V, E) an edge which is directed from one node to another is called a directed edge, while an edge which has no specific direction is called an undirected edge. A graph in which every edge is directed is called a directed graph, or a diagraph".

In addition to the above definition, the same book gives the following additional definitions:

"Any sequence of edges of a diagraph such that the terminal node of any edge in the sequence is the initial node of the edge, if any, appearing next in the sequence defines a path of the graph. A path is said to traverse through the nodes appearing in the sequence originating in the initial node of the first edge and ending in the terminal node of the last edge in the sequence."

"A path which originates and ends in the same node is called a cycle (circuit)."

"A simple diagraph which does not have any cycles is called acyclic."

From the above definition, the properties of an acyclic diagraph can be summarised as:

1. The structure consists only of nodes and edges.
2. Edges are uni-directional.
3. The direct relationship between any two nodes is represented by a maximum of one edge.
4. Indirect relationships, or paths, between any two nodes may exist through edges with other nodes.
5. Each node may have one or more child nodes.
6. Each node may have one or more parent nodes.
7. There may exist ancestor nodes for any given node, which consist of all the successive parents of a particular node.
8. There may exist descendant nodes for any given node, which consist of all the successive children of a particular node.
9. An ancestor of a node cannot be a descendant of the same node.
10. There exists an inverse structure to any given acyclic diagraph structure. The inverse structure to any given acyclic diagraph structure is the same structure but with all the edge directions reversed.

The traditional method to store and manipulate an acyclic directed graph structure in a computer is done using third generation programming languages. Basically this involves using defined memory storage areas as nodes, and pointers as edges. An example using C code is thus:

struct Node
char nodename [10]
struct Node *nextnode[4]}

Where nodename would represent the actual node, and nextnode would represent an edge to another node. Operations on the structure could be programmed using functions or procedures. Examples of such functions may be "Insert Node", "Delete Node", "Attach Node", etc.

Although this method can efficiently implement an acyclic diagraph, there are several considerations to be made with regard to the complexity and reliability of such an implementation.

1. The maximum number of edges associated with a node has to be known in advance.
2. Difficult to find existence of paths between nodes, as all possible paths have to be traversed before a conclusion can be made.
3. No consideration is made on to the reliability of the structure with regards to database concurrency and integrity.
4. No node locking mechanism is available, thus limiting the use of the structure to one user or operation at a time.
5. May encounter problems when using third generation languages with regard to memory allocation or lost pointers which would cause the whole program to crash.

Although a skilled programmer may be able to get around all these limitations, addressing each and every one of them only adds further complexity to the programming to be done. In addition, since everything is done programmatically, there is a greater possibility of hidden bugs in the systems, and the system maintenance may thus prove very difficult and time consuming.

SUMMARY OF THE INVENTION

This invention offers an alternative method of storing and manipulating acyclic directed graph structures by using a relation database.

In accordance with the present invention, there is provided a method for generating an acyclic directed graph structure, or acyclic diagraph, utilising a computer operated relational database, the acyclic diagraph comprising a plurality of nodes directionally coupled to one another so that each node has at least one child node in a forward coupling direction and/or at least one parent node in a reverse coupling direction, comprising:

generating a node table structure indicating a relationship between each node in the acyclic diagraph and at least one node property;

generating an edge table structure indicating a relationship between each directly coupled pair of nodes in the acyclic diagraph; and generating a path table structure indicating existence of a path between any two nodes in the acyclic diagraph.

The present invention also provides a computer stored data structure in a relational database system for representing an acyclic diagraph comprising a plurality of nodes directionally coupled to one another so that each node has at least one child node in a forward coupling direction and/or at least one parent node in a reverse coupling direction, the data structure comprising:

a node table structure indicating a relationship between each node in the acyclic diagraph and at least one node property, the node table structure including a record for each node in the acyclic diagraph, each node table structure record including a node identification field and at least one node property field;

an edge table structure indicating a relationship between each pair of coupled parent and child nodes in the acyclic diagraph, the edge table structure including a record for each pair of parent and child.coupled nodes, each edge table structure record including respective fields to identify the parent node and the child node; and a path table structure indicating existence of a path between any two nodes in the acyclic diagraph, the path table structure including a record for each pair of parent and child coupled nodes and pair of ancestor and descendant coupled nodes wherein two nodes are coupled through an intermediate, each path table structure record including respective fields to identify each of the pair of nodes.

A method of maintaining a data structure as defined above is also provided by the present invention, including:

a node creation procedure for creating a new node in the acyclic diagraph by inserting a new record to the node table structure with a unique value in said node identification field;

a node linking procedure for linking a child node to a parent node in the acyclic diagraph, comprising the steps of:

inserting a new record in the edge table structure identifying the child node and the parent node and a coupling direction from the parent node to the child node;

inserting a new record in the path table structure identifying the child node and the parent node and a coupling direction from the parent node to the child node;

selecting from the path table structure each ancestor node coupled to the parent node and inserting a new record in the path table structure identifying the child node and each ancestor node and a coupling direction from the ancestor node to the child node; and selecting from the path table structure each descendant node to which the child node is coupled and inserting a new record in the path table structure identifying the child node and each descendant node and a coupling direction from the child node to the descendant node;

a node unlinking procedure for unlinking a child node from a parent node in the acyclic diagraph, comprising the steps of:

removing from the edge table structure the record identifying the child node and the parent node;

removing from the path table structure each record identifying the child node; selecting and removing from the path table structure each record identifying an ancestor node of the parent node and a descendant node of the child node; and systematically reviewing the edge table structure beginning with records identifying an ancestor node of the parent node to determine any path from an ancestor node of the parent node to a descendant node of the child node, reviewing the path table structure to if any such path is identified by a path table structure record and inserting a new record into the path table structure identifying that path if none exists in the path table structure; and a remove node procedure for removing a node which has been unlinked from the acyclic diagraph, comprising removing from the node table structure the record identifying the unlinked node.

BRIEF DESCRIPTION OF THE DRAWINGS

The invention is described in greater detail hereinafter, by way of example only, with reference to the accompanying drawings, wherein.

DETAILED DESCRIPTION OF THE PREFERRED EMBODIMENTS

Described herein is a method to implement acyclic diagraph structures with the use of a commercially available relation database. Various operations are described on how to store, retrieve, update and maintain items in the structure.

The advantages of using commercially available databases are:

1. Currently available in the market place at affordable prices.
2. Speeds up application development time.
3. Utilises the strengths of relational databases. These include the reliability, networking capability, indexing capabilities, etc.
4. Relational databases are based on the mathematical concepts of set theory and tuple calculus. The same concepts are used for operations on an acyclic diagraph structure.

This preferred form of the invention employs three database tables. The tables are:

1. Node Table

This table stores the properties of each node. A key field must be used to uniquely identify each node. Any number of additional fields can also be used to represent additional properties of the node. Thus each record in this table would represent a node in an acyclic directed tree structure.

2. Edge Table

This table stores the relationship between any two nodes. It must consist of at least two fields, a parent field (or initial node field) and a child field (or terminal node field). Thus each record within this table would thus represent an edge in an acyclic directed graph structure.

3. Path Table

This table list paths between any two nodes. This table must consist of at least two fields, an ancestor field, which is the initial node of the path, and a descendant field, which is the terminal node in the path. Thus each record within this table would represent a path in the acyclic directed graph structure. Note that this table does not list the routes between any two nodes, that has to be derived from a traverse if the edge table, but only the existence of a path between any two nodes. This is sufficient as it will show that there is a relationship between the two nodes.

It is important that the integrity between all three tables be kept. The following rules can be utilised in order to ensure integrity is maintained:

1. Each value in the parent field, child field, ancestor field and descendant field must be able to be mapped to a key field record in the nodes table.
2. All paths as represented in the Path table must be able to be reproduced through traversing the nodes using the Edge table.
3. All possible paths in the structure which are traceable by traversing the nodes in the Edge table, are represented in the Path table.

Figure 1:
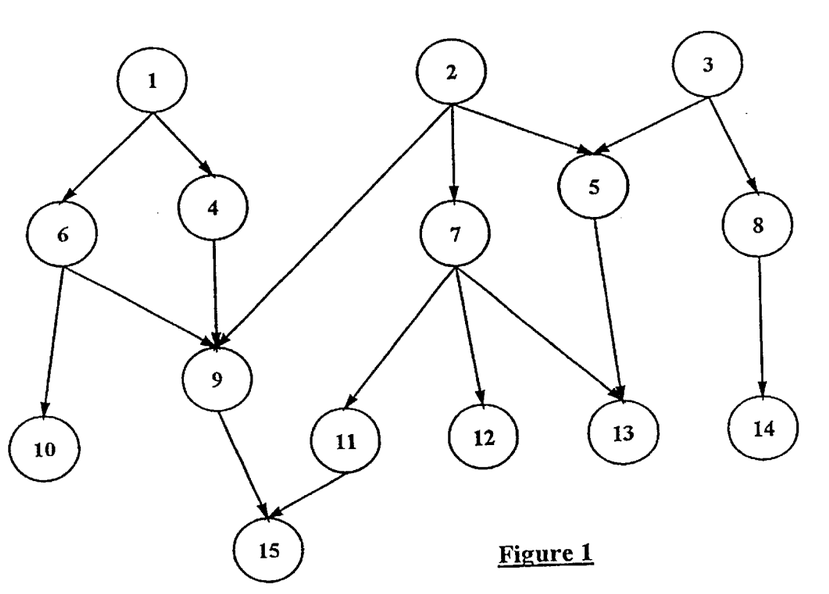
FIG. 1 is a representative diagram of an acyclic directed graph structure.

If all these three rules are kept, then these three tables will thus represent an acyclic directed graph structure. Note that this method also allows more than one acyclic diagraph structure to exist in the database at any one time, and also allows the different structures to merge together, or split up into two different structures. Also note that this technique also allows us to not only represent an acyclic directed graph structure, but also its inverse structure. An example of such a structure in a relational database is represented by Tables 1, 2 and 3 below, and shown in diagrammatic form in FIG. 1.

TABLE 1

Node Table

| Node | Property (Colour) |
|---|---|
| 1 | Blue |
| 2 | Green |
| 3 | Blue |
| 4 | Red |
| 5 | Brown |
| 6 | Green |
| 7 | Red |
| 8 | Blue |
| 9 | Violet |
| 10 | Brown |
| 11 | Green |
| 12 | Blue |

TABLE 1-continued

Node Table

| Node | Property (Colour) |
|---|---|
| 13 | Violet |
| 14 | Blue |
| 15 | Red |

TABLE 2

Edge Table

| Parent | Child |
|---|---|
| 1 | 6 |
| 1 | 4 |
| 2 | 9 |
| 2 | 7 |
| 2 | 5 |
| 3 | 5 |
| 3 | 8 |
| 4 | 9 |
| 5 | 13 |
| 6 | 9 |
| 6 | 10 |
| 7 | 11 |
| 7 | 12 |
| 7 | 13 |
| 8 | 14 |
| 9 | 15 |
| 11 | 15 |

TABLE 3

Path Table

| Ancestor | Descendant |
|---|---|
| 1 | 4 |
| 1 | 6 |
| 1 | 9 |
| 1 | 10 |
| 1 | 15 |
| 2 | 5 |
| 2 | 7 |
| 2 | 9 |
| 2 | 11 |
| 2 | 12 |
| 2 | 13 |
| 2 | 15 |
| 3 | 5 |
| 3 | 8 |
| 3 | 13 |
| 3 | 14 |
| 4 | 9 |
| 4 | 15 |
| 5 | 13 |
| 6 | 9 |
| 6 | 10 |
| 7 | 11 |
| 7 | 12 |
| 7 | 13 |
| 8 | 14 |
| 9 | 15 |
| 11 | 15 |

In order to efficiently manipulate the acyclic directed graph structure, several operations need to be defined. The following is a description of the operations as well as sample Microsoft SQL Server code on how to implement the operations.

Create Node

This operation crates a new node in the structure. A new node in the structure is represented by a new record in the node table. A new key value must also be generated to uniquely identify this new node. One or more additional properties may also be specified for the new node. A new node once created, will exist independently from the rest of the structure. It must be linked to a node already in the structure to become part of it.

EXAMPLE

INSERT INTO node_table (node, property)
VALUES (16, Blue);

Remove Node

This operation removes a node from the structure entirely. Note that the node must first by unlinked from all other nodes before it is removed.

Link Node

This operation links a node (Child note) to another node (Parent node) in the structure. By linking the two nodes, new paths may also be formed in the structure. Part of this algorithm is to ensure that there is integrity in the structure. The algorithm is:

1. Determine whether a cyclic path would be formed by the Link operation. (This can easily be done by ensuring that the Child node to be linked is not already an ancestor node of the Parent node to be linked to). If a cyclic path would be formed then the procedure is terminated since the resulting structure would not be acyclic.
2. Link the Child node to the Parent node.
3. Determine whether at least one of the new paths already exist in the structure. (If at least one new path already exists, then all possible new paths should already exist in structure).
4. End operation if paths already exist, else continue on to the next step.
5. Generate a list of all new paths and add corresponding records to the Path table. This can be done by:
   i) Adding all ancestors of the parent node as ancestors of the descendants of the child node into the Path table.
   ii) Adding all the ancestors of the parent node as ancestors of the child node into the Path table.
   iii) Adding all the descendants of the child node as descendants of the parent node into the Path table.
   iv) Adding the Parent node and Child node as ancestor and descendant respectively into the Path table.

Example of Link Operation

```
CREATE PROCEDURE Link @parent_node, @child_node
AS
DECLARE    @ancestor int
DECLARE    @testcount int
DECLARE    nodeancestor   INSENSITIVE CURSOR
    FOR    SELECT     DISTINCT ancestor
           FROM path_table
           Where descendant = @parent_node
BEGIN
    SELECT     @testcount = COUNT (ancestor)
    FROM       path_table
    WHERE descendant = @parent_node
    AND        ancestor = @child_node
```

```
IF @testcount > 0
BEGIN
    RAISERROR ('Illegal Link, Cyclic path not allowed',16,-1)
    RETURN
END
INSERT INTO       edge_table (parent, child)
VALUES            @parent_node, @child_node
SELECT            @testcount = COUNT (ancestor)
FROM              path_table
WHERE     ancestor = @parent_node
AND               descendant = @child_node
IF @testcount > 0
BEGIN
    RETURN     /* Path already exist in structure */
END
OPEN    nodeancestor
FETCH   nodeancestor INTO @ancestor
WHILE   @@fetch_status = 0
BEGIN
    INSERT INTO       path_table (ancestor, descendant)
    SELECT            @ancestor, descendant
    FROM              path_table
    WHERE             ancestor = @child_node
    AND               descendant NOT IN
                      {   SELECT    descendant
                          FROM      path_table
                          WHERE ancestor =
                                @ancestor)
    INSERT INTO       path_table (ancestor, descendant)
    SELECT DISTINCT   parent, @child_node
    FROM              edge_table
    WHERE     parent = @ancestor
    AND               child_node NOT IN
                      {   SELECT    descendant
                          FROM      path_table
                          WHERE ancestor =
                                @ancestor)
    FETCH nodeancestor INTO @ancestor
END
    INSERT INTO       path_table (ancestor, descendant)
    SELECT            @parent_node, descendant
    FROM              path_table
    WHERE     ancestor = @child_node
    AND               descendant NOT IN
                      {   SELECT    descendant
                          FROM      path_table
                          WHERE ancestor =
                                @parent_node)
    INSERT INTO       path_table (ancestor, descendant)
    SELECT DISTINCT   parent,@child node
    FROM              edge_table
    WHERE     parent = @parent_node
    AND               @child_node NOT IN
                      {   SELECT    descendant
                          FROM      path_table
                          WHERE ancestor =
                                @parent_node)
END
```

Unlink Node

This operation unlinks a node (Child node) from another node (Parent node) in the structure. By unlinking any two nodes, the paths table needs to be updated to reflect that some of the paths are no longer valid. The algorithm for the unlink operation can be expressed as:

1. Remove from the edge table the link between the Parent node and Child node. Link the Child node to the Parent node.
2. Remove from the path table all links between ancestors of the parent node and descendants of the child node.

3. Remove from the path table the link between the parent node and child node.
4. Add back to the path table all links which may exist between the ancestors of the parent node and the descendants of the child node through alternative paths.
5. Add back to the path table the link between the parent node and child node if such a path does exist through an alternative route.

Example of Unlink Operation

```
CREATE PROCEDURE unlink @parent-node, @child_node
AS
DECLARE    @ancestor int
DECLARE    @testcount int
DECLARE    nodeancestor    SCROLL CURSOR
    FOR    SELECT            DISTINCT path_table1.ancestor
           FROM path_table as path_table1
           INNER JOIN path_table as path_table2
               ON             path_table1.ancestor = path_table2.ancestor
               WHERE          path_table1.descendant = @child_node
               AND            (path_table2.descendant = @parent_node
                              OR path_table1.ancestor = @parent node)
BEGIN
           DELETE FROM    edge_table
           WHERE          parent = @parent_node
           AND            child = @child_node
           OPEN           nodeancestor
           FETCH FIRST nodeancestor INTO @ancestor
           WHILE          @@fetch_status = 0
           BEGIN
              DELETE FROM    path_table
              WHERE          ancestor = @ancestor
              AND            (descendant IN
                             {   SELECT   descendant
                                 FROM path_table
                                 WHERE    ancestor = @child_node)
                             OR descendant = @class_node)
              FETCH NEXT nodeancestor INTO @ancestor
           END
           FETCH FIRST nodeancestor INTO @ancestor
           WHILE          @@fetch_status = 0
           BEGIN
              INSERT INTO    path_table (ancestor, descendant)
              SELECT         @ancestor, child
              FROM           edge_table
              INNER JOIN     path_table ON parent = descendant
              WHERE          ancestor = @ancestor
              AND            child NOT IN ( SELECT descendant
                                            FROM path_table
                                            WHERE ancestor = @ancestor)
              INSERT INTO    path_table (ancestor, descendant)
              SELECT         @ancestor, child
              FROM           edge_table
              WHERE          parent = @ancestor
              AND            child NOT IN ( SELECT descendant
                                            FROM path_table
                                            WHERE ancestor = @ancestor)
              FETCH NEXT FROM nodeancestor INTO @ancestor
           END
END
```

TABLE 4

Node Table

| Node | Classification |
|---|---|
| 1 | Flow Control Equipment |
| 2 | Valves |
| 3 | Pumps |
| 4 | Waste Treatment Equipment |

Figure 2:
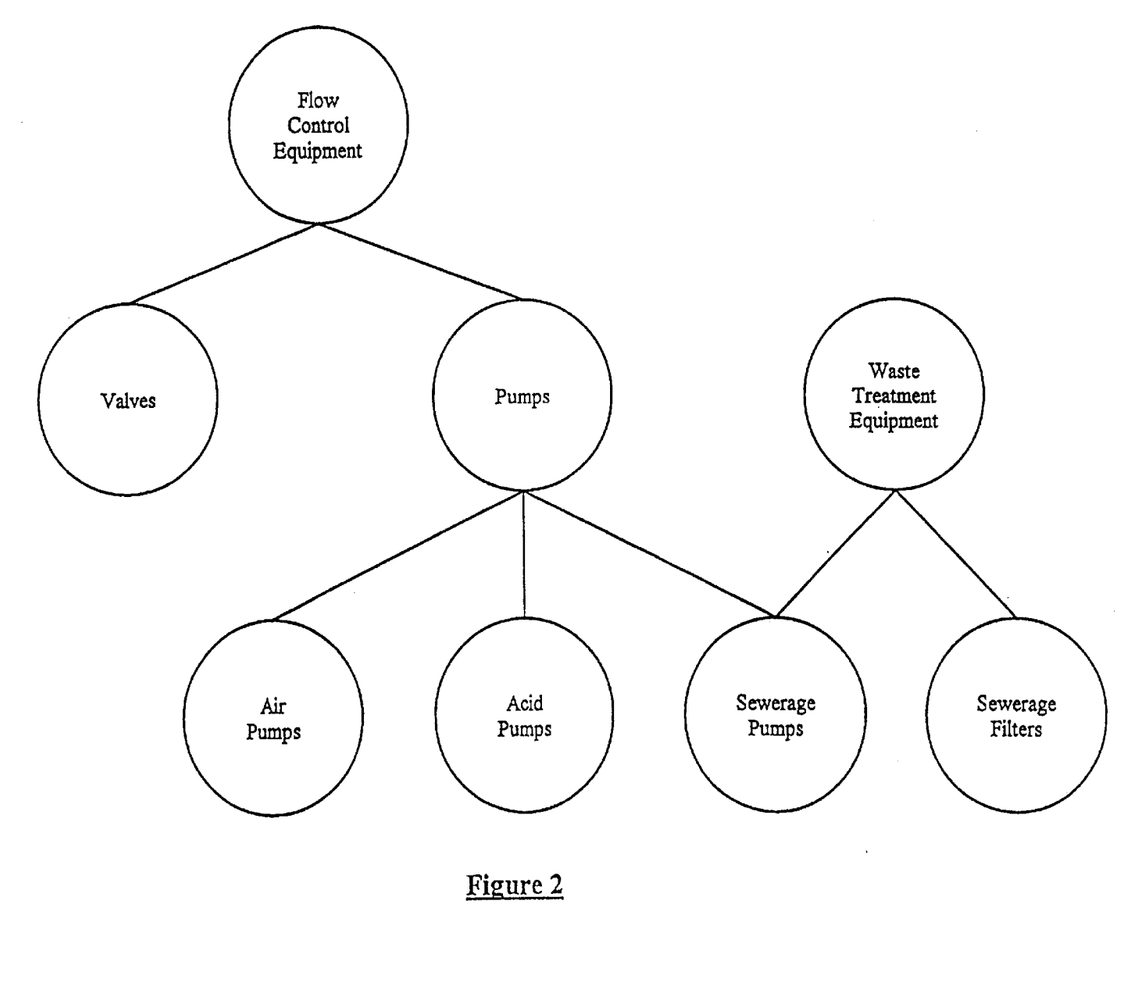
FIG. 2 is an example of another acyclic diagraph structure.

An example of how this technique may be applied is be in a Classification System. A Business Directory may have several hundred products and services classifications. These classifications may be organised into a directed-graph structure. An illustration of a part of a sample classification structure is shown in FIG. 2.

Using the described technique for representing this classification system, the following tables are developed.

TABLE 4-continued

Node Table

| Node | Classification |
|---|---|
| 5 | Air Pumps |
| 6 | Acid Pumps |

TABLE 4-continued

Node Table

| Node | Classification |
|---|---|
| 7 | Sewerage Pumps |
| 8 | Sewerage Filters |

TABLE 5

Edge Table

| Parent | Child |
|---|---|
| 1 | 2 |
| 1 | 3 |
| 3 | 5 |
| 3 | 6 |
| 3 | 7 |
| 4 | 7 |
| 4 | 8 |

TABLE 6

Path Table

| Ancestor | Descendant |
|---|---|
| 1 | 2 |
| 1 | 3 |
| 1 | 5 |
| 1 | 6 |
| 1 | 7 |
| 3 | 5 |
| 3 | 6 |
| 3 | 7 |
| 4 | 7 |
| 4 | 8 |

It is then possible to relate companies to any given classification, and in doing so, make sure that all ancestor classifications may also 'inherit' this relationship. For example, supposing it is desired to ralate the company "Caterpillar Pumps Ltd" to "Air Pumps" by inserting a record into a table specially created to represent this relationship. The following table would result:

Company Classification Table

| Classification Node | Company |
|---|---|
| 5 | Caterpillar Pumps Ltd |

The Path Table can then be used to reflect the same relationship to the ancestor classifications. A sample SQL statement to do this would be:

INSERT INTO any_classification_table
SELECT ancestor, "Caterpillar Pumps Ltd"
FROM pat_table
WHERE descendant=5
the resultant table would then be:

| Classification Node | Company |
|---|---|
| 1 | Caterpillar Pumps Ltd |
| 3 | Caterpillar Pumps Ltd |
| 5 | Caterpillar Pumps Ltd |

If further companies were then added to the system, say "Calpeda Valves Ltd" to the classification "Valves" and "Green Treatment Ltd" to "Sewerage Pumps", then the following table would result:

| Classification Node | Company |
|---|---|
| 1 | Caterpillar Pumps Ltd |
| 3 | Caterpillar Pumps Ltd |
| 5 | Caterpillar Pumps Ltd |
| 1 | Calpeda Valves Ltd |
| 2 | Calpeda Valves Ltd |
| 1 | Green Treatment Ltd |
| 3 | Green Treatment Ltd |
| 4 | Green Treatment Ltd |
| 7 | Green Treatment Ltd |

The same table, but now sorted by classifications would thus look like this:

| Classification Node | Company |
|---|---|
| 1 | Caterpillar Pumps Ltd |
| 1 | Calpeda Valves Ltd |
| 1 | Green Treatment Ltd |
| 2 | Calpeda Valves Ltd |
| 3 | Caterpillar Pumps Ltd |
| 3 | Green Treatment Ltd |
| 4 | Green Treatment Ltd |
| 5 | Caterpillar Pumps Ltd |
| 7 | Green Treatment Ltd |

Thus it is possible to quickly maintain a proper "inheritance" structure without needing to find the root node, nor needing to traverse any paths.

The foregoing detailed description of the preferred implementation of the invention has been presented by example only, and is not intended to be considered limiting to the invention as defined in the claims appended hereto.

What is claimed is:

1. A method for generating an acyclic directed graph structure, or acyclic diagraph, utilising a computer operated relational database, the acyclic diagraph comprising a plurality of nodes directionally coupled to one another so that each node has at least one child node in a forward coupling direction and/or at least one parent node in a reverse coupling direction, comprising:
   generating a node table structure indicating a relationship between each node in the acyclic diagraph and at least one node property;
   generating an edge table structure indicating a relationship between each directly coupled pair of nodes in the acyclic diagraph; and
   generating a path table structure indicating existence of a path between any two nodes in the acyclic diagraph, wherein:

the node table structure includes a record for each node in the acyclic diagraph, each node table structure record including a node identification field and at least one node property field;

the edge table structure includes a record for each directly coupled pair of nodes, each edge table structure record including respective fields to identify each of the pair of nodes, the order of the fields in each edge table structure record indicating a direction of coupling of the nodes identified in the record; and the path table structure includes a record for each directly coupled pair of nodes and each indirectly coupled pair of nodes, each path table structure record including respective fields to identify each of the pair of nodes, and the order of the fields in each path table structure record indicating a direction of coupling of the nodes identified in the record, and wherein the method further includes a node unlinking procedure for unlinking a child node from a parent node in the acyclic diagraph, comprising the steps of:

removing from the edge table structure the record identifying the child node and the parent node;

removing from the path table structure each record identifying the child node;

selecting and removing from the path table structure each record identifying an ancestor node of the parent node and a descendant node of the child node; and systematically reviewing the edge table structure beginning with records identifying an ancestor node of the parent node to determine the existence of any other path from an ancestor node of the parent node to a descendant node of the child node, reviewing the path table structure to identify if any such path has already been identified by a path table structure record and inserting a new record into the path table structure identifying that path if none exists in the path table structure.

2. A method as claimed in claim 1, wherein the node table structure includes a record for each node in the acyclic diagraph, each node table structure record including a node identification field and at least one node property field.

3. A method as claimed in claim 1, wherein the edge table structure includes a record for each directly coupled pair of nodes, each edge table structure record including respective fields to identify each of the pair of nodes.

4. A method as claimed in claim 3, wherein the order of the fields in each edge table structure record indicates a direction of coupling of the nodes identified in the record.

5. A method as claimed in claim 1, wherein the path table structure includes a record for each directly coupled pair of nodes and each indirectly coupled pair of nodes, each path table structure record including respective fields to identify each of the pair of nodes.

6. A method as claimed in claim 5, wherein the data contained in the edge table structure comprises a sub-set of the data contained in the path table structure.

7. A method as claimed in claim 5, wherein the order of the fields in each path table structure record indicates a direction of coupling of the nodes identified in the record.

8. A method as claimed in claim 1, including a node creation procedure for creating a new node in the acyclic diagraph by inserting a new record to the node table structure with a unique value in said node identification field.

9. A method as claimed in claim 8, including a node linking procedure for linking the new node as a child node to a parent node in the acyclic diagraph, comprising the steps of:

inserting a new record in the edge table structure identifying the child node and the parent node and a coupling direction from the parent node to the child node;

inserting a new record in the path table structure identifying the child node and the parent node and a coupling direction from the parent node to the child node;

selecting from the path table structure each ancestor node coupled to the parent node and inserting a new record in the path table structure identifying the child node and each ancestor node and a coupling direction from the ancestor node to the child node.

10. A method as claimed in claim 1, including a node linking procedure for linking a child node to a parent node in the acyclic diagraph, comprising the steps of:

inserting a new record in the edge table structure identifying the child node and the parent node and a coupling direction from the parent node to the child node;

inserting a new record in the path table structure identifying the child node and the parent node and a coupling direction from the parent node to the child node;

selecting from the path table structure each ancestor node coupled to the parent node and inserting a new record in the path table structure identifying the child node and each ancestor node and a coupling direction from the ancestor node to the child node; and selecting from the path table structure each descendant node to which the child node is coupled and inserting a new record in the path table structure identifying the parent node and each descendant node and a coupling direction from the parent node to the descendant node.

11. A method as claimed in claim 1, including a remove node procedure for removing a node which has been unlinked from the acyclic diagraph, comprising removing from the node table structure the record identifying the unlinked node.

12. A method of maintaining a computer stored data structure in a relational database system for representing an acyclic diagraph comprising a plurality of nodes directionally coupled to one another so that each node has at least one child node in a forward coupling direction and/or at least one parent node in a reverse coupling direction, the data structure comprising:

a node table structure storing a relationship between each node in the acyclic diagraph and at least one node property, the node table structure including a record for each node in the acyclic diagraph, each node table structure record including a node identification field and at least one node property field;

an edge table structure storing a relationship between each pair of coupled parent and child nodes in the acyclic diagraph, the edge table structure including a record for each pair of parent and child coupled nodes, each edge table structure record including respective fields to identify the parent node and the child node; and a path table structure storing representation of a path between any two nodes in the acyclic diagraph, the path table structure including a record for each pair of parent and child coupled nodes and pair of ancestor and descendant coupled nodes wherein two nodes are coupled through an intermediate, each path table structure record including a respective fields to identify each of the pair of nodes, the method comprising:

a node creation procedure for creating a new node in the acyclic diagraph by inserting a new record to the node table structure with a unique value in said node identification field;

a node linking procedure for linking a child node to a parent node in the acyclic diagraph, comprising the steps of:

inserting a new record in the edge table structure identifying the child node and the parent node and a coupling direction from the parent node to the child node;

inserting a new record in the path table structure identifying the child node and the parent node and a coupling direction from the parent node to the child node;

selecting from the path table structure each ancestor node coupled to the parent node and inserting a new record in the path table structure identifying the child node and each ancestor node and a coupling direction from the ancestor node to the child node; and selecting from the path table structure each descendant node to which the child node is coupled and inserting a new record in the path table structure identifying the child node and each descendant node and a coupling direction from the child node to the descendant node;

a node unlinking procedure for unlinking a child node from a parent node in the acyclic diagraph, comprising the steps of:

removing from the edge table structure the record identifying the child node and the parent node;

removing from the path table structure each record identifying the child node;

selecting and removing from the path table structure each record identifying an ancestor node of the parent node and a descendant node of the child node; and systematically reviewing the edge table structure beginning with records identifying an ancestor node of the parent node to determine any path from an ancestor node of the parent node to a descendant node of the child node, reviewing the path table structure to identify if any such path has already been identified by a path table structure record and inserting a new record into the path table structure identifying that path if none exists in the path table structure; and a remove node procedure for removing a node which has been unlinked from the acyclic diagraph, comprising removing from the node table structure the record identifying the unlinked node.

13. The method of claim 12, wherein the method is used in a product and/or service classification system comprising the computer stored data structure, and wherein the at least one node property in said node table structure represents a particular product or service associated with the corresponding node of the acyclic diagraph.

14. The method of claim 13, wherein the product and/or service classification system includes a classification table structure for storing a relationship between a supplier or customer and a node in the acyclic diagraph, the classification table structure having at least one record including a node identification field for identifying a said node in the acyclic diagraph and a company identification field for identifying a corresponding supplier or customer.

15. The method of claim 14, wherein the classification table structure includes a record having a corresponding company identification field for each ancestor node of any node identified in the classification table, according to the path table structure.

16. A method of maintaining a product and/or service classification system comprising a computer stored data structure in a relational database system for representing an acyclic diagraph comprising a plurality of nodes directionally coupled to one another so that each node has at least one child node in a forward coupling direction and/or at least one parent node in a reverse coupling direction, the data structure comprising:

a node table structure storing a relationship between each node in the acyclic diagraph and at least one node property, the node table structure including a record for each node in the acyclic diagraph, each node table structure record including a node identification field and at least one node property field;

an edge table structure storing a relationship between each pair of coupled parent and child nodes in the acyclic diagraph, the edge table structure including a record for each pair of parent and child coupled nodes, each edge table structure record including respective fields to identify the parent node and the child node; and a path table structure storing representation of a path between any two nodes in the acyclic diagraph, the path table structure including a record for each pair of parent and child coupled nodes and pair of ancestor and descendant coupled nodes wherein two nodes are coupled through an intermediate, each path table structure record including a respective fields to identify each of the pair of nodes, wherein the at least one node property in said node table structure represents a particular product or service associated with the corresponding node of the acyclic diagraph, the method comprising:

a node creation procedure for creating a new node in the acyclic diagraph by inserting a new record to the node table structure with a unique value in said node identification field and a product or service identification in said node property field;

a node linking procedure for linking a child node to a parent node in the acyclic diagraph, comprising the steps of:

inserting a new record in the edge table structure identifying the child node and the parent node and a coupling direction from the parent node to the child node;

inserting a new record in the path table structure identifying the child node and the parent node and a coupling direction from the parent node to the child node;

selecting from the path table structure each ancestor node coupled to the parent node and inserting a new record in the path table structure identifying the child node and each ancestor node and a coupling direction from the ancestor node to the child node; and selecting from the path table structure each descendant node to which the child node is coupled and inserting a new record in the path table structure identifying the child node and each descendant node and a coupling direction from the child node to the descendant node;

a node unlinking procedure for unlinking a child node from a parent node in the acyclic diagraph, comprising the steps of:

removing from the edge table structure the record identifying the child node and the parent node;

removing from the path table structure each record identifying the child node;

selecting and removing from the path table structure each record identifying an ancestor node of the parent node and a descendant node of the child node; and systematically reviewing the edge table structure beginning with records identifying an ancestor node of the parent node to determine any path from an ancestor node of the parent node to a descendant node of the child node, reviewing the path table structure to identify if any such path has already been identified by a path table structure record and inserting a new record into the path table structure identifying that path is none exists in the path table structure; and a remove node procedure for removing a node which has been unlinked from the acyclic diagraph, comprising removing from the node table structure the record identifying the unlinked node.

17. A method of maintaining a product and/or service classification system as claimed in claim 16, including a company classification procedure for generating a company classification table structure by:

specifying at least one supplier or customer company associated with at least one node in the acyclic diagraph;

systematically reviewing the path table structure to determine each ancestor node to said at least one node associated with the specified company; and generating a company classification table structure having a record identifying each determined ancestor node and the at least one specified company associated therewith.

18. A method of maintaining a product and/or service classification system as claimed in claim 17, wherein the company classification table includes a stored correspondence between the at least one specified company and the products and/or services corresponding to each determine ancestor node from node table structure.

* * * * *